United States Patent
Lovell et al.

[11] Patent Number: 5,992,710
[45] Date of Patent: Nov. 30, 1999

[54] LID WITH INTEGRALLY MOLDED POURING SPOUT

[75] Inventors: Peter J. Lovell, Oakville; Stephen H. Arshinoff, Willowdale, both of Canada

[73] Assignee: Industrial Containers, Ltd., Toronto, Canada

[21] Appl. No.: 08/776,884

[22] PCT Filed: Jun. 5, 1996

[86] PCT No.: PCT/CA96/00386

§ 371 Date: Aug. 25, 1997

§ 102(e) Date: Aug. 25, 1997

[87] PCT Pub. No.: WO96/41749

PCT Pub. Date: Dec. 27, 1996

[30] Foreign Application Priority Data

Jun. 8, 1995 [GB] United Kingdom .................. 9511645

[51] Int. Cl.⁶ ............................................. B65D 47/10
[52] U.S. Cl. ..................... 222/525; 222/538; 222/541.6
[58] Field of Search ........................ 222/522, 525, 222/538, 541.6, 541.9

[56] References Cited

U.S. PATENT DOCUMENTS

| | | |
|---|---|---|
| 2,774,523 | 12/1956 | Rieke ................................. 222/538 X |
| 3,235,146 | 2/1966 | Parish, Jr. et al. .................. 222/538 X |
| 3,310,206 | 3/1967 | Littlefield ............................... 222/525 |
| 3,372,846 | 3/1968 | Berkus ................................. 222/538 X |
| 3,685,933 | 8/1972 | Schneider . |
| 4,022,357 | 5/1977 | Dwinell ............................... 222/538 X |
| 4,163,512 | 8/1979 | Dwinell ............................... 222/538 X |
| 4,311,259 | 1/1982 | Babiol ..................................... 222/525 |
| 4,597,508 | 7/1986 | MacLarty ........................... 222/522 X |
| 4,650,096 | 3/1987 | Thatcher . |
| 4,653,669 | 3/1997 | Von Holdt . |

FOREIGN PATENT DOCUMENTS 0 008 282   1/1979   European Pat. Off. .

*Primary Examiner*—Joseph A. Kaufman
*Attorney, Agent, or Firm*—Fredrikson & Byron, P.A.

[57] ABSTRACT

A pail lid having a retractable pouring spout. The pail lid has a neck integrally formed as part of the lid and extending from the face of the lid opposed to a peripheral groove. The neck has external threads adapted to receive a screw cap. A retractable pouring spout located within the opening is movable from a pouring position to a retracted position while being retained within the neck. The spout mates with the neck at the pouring position and the retracted position. An injection molding process for manufacture of the lid is also disclosed.

6 Claims, 4 Drawing Sheets

LID WITH INTEGRALLY MOLDED POURING SPOUT

The present invention relates to a lid for a pail in which there is a pouring spout for the purpose of removing contents of the pail, and in particular to a lid for a pail in which the pouring spout has been integrally injection molded with the remainder of the lid and subsequently severed therefrom to provide a lid with a retractable spout. As used herein, pails include so-called plastic containers having lids.

When the material within a pail is in a fluid form, including powders and liquids, it is convenient to be able to pour the fluid from the container without removing the lid from the container. It is easier and more convenient to use a spout located on the lid to remove the contents from the container, as opposed to removing the lid from the container and pouring the contents directly from the lid-less container.

Lids having spouts are known and frequently used in the pail and container business. Such lids have a neck in which a spout is attached, with the spout being movable from an inverted storage position and reattached in a pouring position prior to use. Alternatively, the lid may have a spout that is movable, without being inverted, from a pouring position to a storage position with the latter being adapted for sealing with a cap.

The formation or manufacture of containers with lids with retractable spouts has required a multi-step manufacturing process, using at least two separate molds. The lid is manufactured in one injection molding operation, normally with an orifice at the location where the spout is to be located. The spout is manufactured in a separate manufacturing process and subsequently attached to the lid by spin-welding or ultrasonic welding, or by snap-fitting a spout into a hole in the lid. The latter is prone to leakage, especially due to non-uniform shrinkage of the lid after molding, which has led to attempts to mold non-circular holes that after shrinkage of the lid are circular in shape.

Such molding-techniques require the construction of separate molds for the spout and for the remainder of the lid, as well as the carrying out of several steps in the process to form the lid with the retractable spout.

A lid with a retractable spout, and a method for the manufacture thereof, have now been found in which the lid and spout are formed in the same molding operation.

Accordingly, the present invention provides a pail lid having a retractable pouring spout, said pail lid having opposed faces with an annular groove on one face at the periphery thereof for attachment to a pail, said lid having an opening between said faces juxtaposed to said annular groove with an annular neck surrounding said opening, said neck being integrally formed as part of said lid and extending from the face of the lid opposed to said groove, said neck having external threads thereon adapted to receive a screw cap, a retractable pouring spout located within said opening that is movable from a pouring position to a retracted position while being retained within said neck, the spout mating with the neck at each of the pouring position and the retracted position.

The present invention also provides a method for the manufacture of a pail lid having a retractable pouring spout, said pail lid having opposed faces with an annular groove on one face at the periphery thereof for attachment to a pail, said lid having an opening between said faces juxtaposed to said annular groove with an annular neck surrounding said opening, said neck being integrally formed as part of said lid and extending from the face of the lid opposed to said groove, said neck having external threads thereon adapted to receive a screw cap, a retractable pouring spout located within said opening, said spout being movable from a pouring position to a retracted position, while being retained within said neck, the spout mating with the neck at each of the pouring position and the retracted position, said method comprising:

(a) in injection molding apparatus, feeding molten thermoplastic polymer to a cavity of a mold for said lid, said cavity of the mold extending between the neck and the spout with a narrow gate between said neck and spout, (b) forming the lid with the neck integrally connected to the spout, cooling the polymer and ejecting the lid so formed from the injection molding apparatus, (c) separating the spout from the neck by severing the polymer at the narrow gate so that said spout is movable within said neck but being retained therein.

In addition, the present invention provides in a method for the manufacture of a lid with a retractable pouring spout in which said lid is formed from a thermoplastic polymer, said pouring spout being located within a neck protruding from a face of said lid, said spout being retained within the neck but being movable between a first position and a second position within said neck, the improvement comprising forming said lid in injection molding apparatus with said pouring spout integrally connected to said neck by a narrow gate of polymer, cooling the lid so formed, separating the spout from the neck by severing said polymer at said narrow gate, such that the spout is movable between said first and second positions.

In preferred embodiments of the method of the invention, the narrow gate between the neck and the spout extends around the circumference of the neck and spout.

In another embodiment, the molten polymer is fed to the cavity of the mold for the lid through a gate centrally located therein.

The present invention will be described with particular reference to the embodiments shown in the drawings in which.

Figure 1:
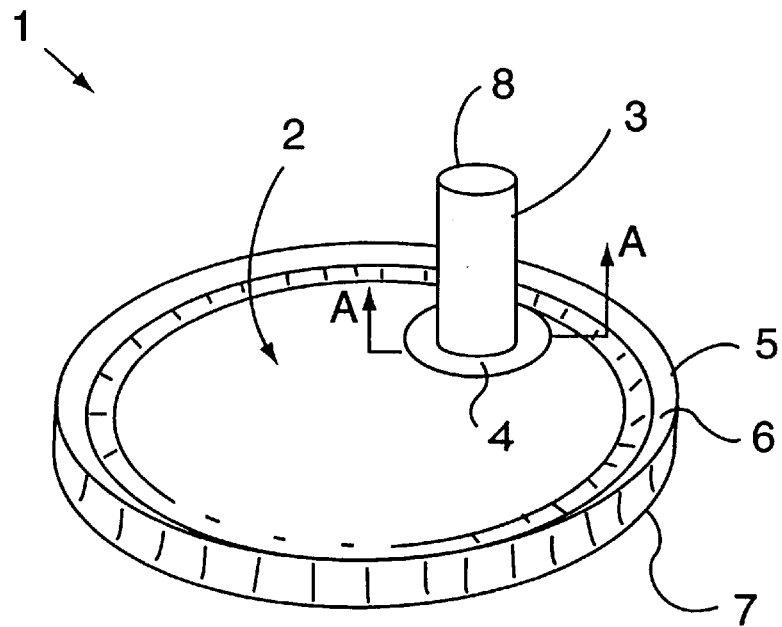
FIG. 1 is a schematic representation of a pail lid with a pouring spout in the extended position.

FIG. 1 shows a lid, generally indicated by 1, that has an upper surface or face 2 and a spout 3. Spout 3 is located off-center on lid 1, and passes through neck 4 which is integrally connected to upper surface 2. Lid 1 has edge 5 with ridge 6 extending above the plane of upper section 2 and skirt 7 extending downwards from edge 5. Ridge 6 corresponds to a groove (not shown) on the underside of lid 1, which is used for location and attachment of lid 1 on a pail. Spout 3 is shown in a pouring position. It is understood that spout 3 would be juxtaposed to ridge 6 but spaced therefrom, at a convenient location for pouring of the contents of the pail from the pail; the location is referred to herein as juxtaposed to the ridge/groove at the periphery of the lid.

The gate used in the injection molding of lid 1 is preferably located at the center of upper surface 2.

Figure 1A:
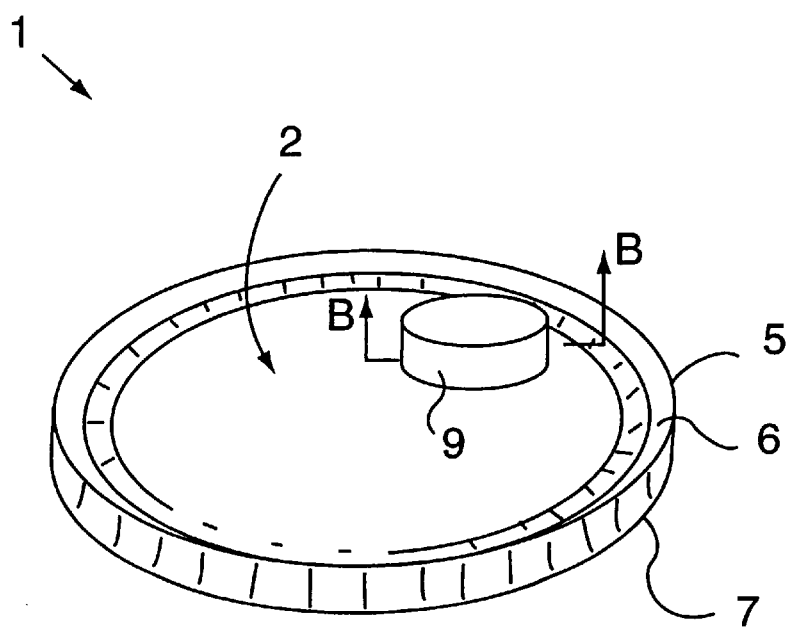
FIG. 1A is a schematic representation of a pail with a pouring spout in a retracted position, with an end cap.

FIG. 1A shows lid 1 of FIG. 1 with spout 3 in a retracted position. Spout 3 is not seen in FIG. 1A, as it is covered by end cap 9, such that a closure to the pail is formed. FIG. 1 represents the lid during use for removal of the contents of the pail, whereas FIG. 1A represents the lid when on a container during storage or shipment. It is understood that lid 1 normally would be designed, in association with the design of pails on which the lid would be used, such that end cap 9 would not inhibit the stacking of pails with lid 1, as will be understood by persons skilled in the art. End cap 9 could be of a height less than that of ridge 6, but as pails are normally designed with a recessed underside (bottom), end cap 9 could extend above ridge 6 for a distance less that the depth of the recess on the underside of the pail on which it is to be used.

In operation, lid 1 is placed on a pail e.g. a pail containing a fluid, for instance a powder or liquid. Spout 3 would normally be in a retracted position, with end cap 9 in position, so that the pail could be shipped or stored, including stacked in a warehouse. In such an arrangement lid 1 would seal the contents of the pail within the pail. At the time that fluid was to be poured from the pail, end cap 9 would be removed from neck 4 and spout 3 would be extended into the position shown in FIG. 1. The pail would then be tipped to a suitable degree so that contents within the pail would flow from the pail.

In the method of the present invention, lid 1 is integrally molded in a single molding step in a mold. Subsequent to the moulding step, after cooling of the thermoplastic polymer, spout 3 is separated from the remainder of lid 1 so that it may be located in either a pouring position or retracted position within neck 4. It is understood that it is intended that spout 3 would always be located within neck 4 i.e. it will not fall out of neck 4 regardless of the orientation of the pail.

Figure 2:
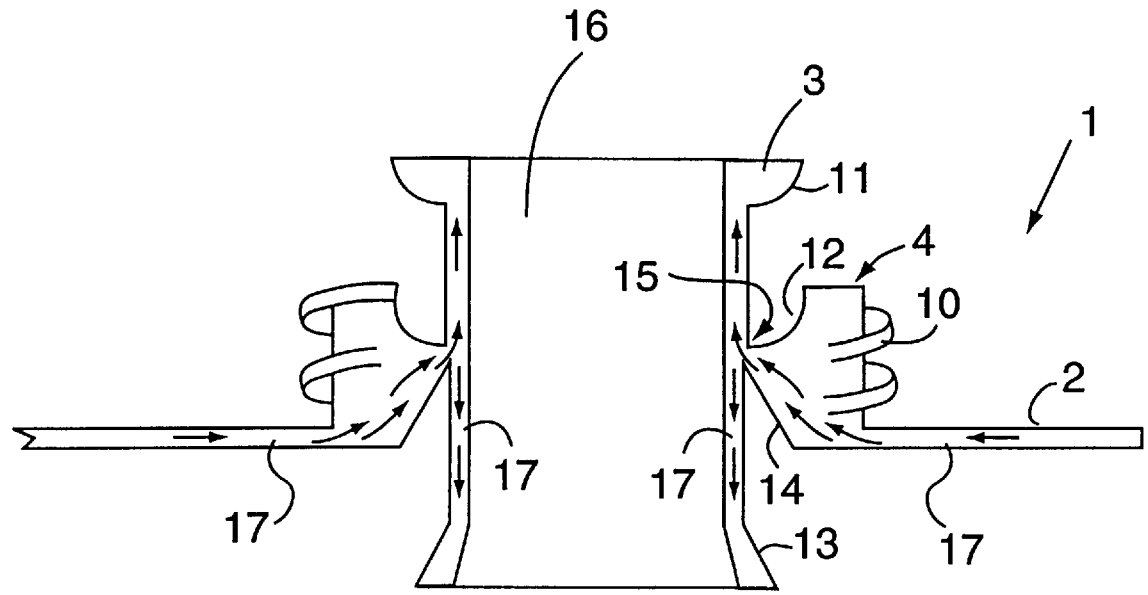
FIG. 2 is a schematic representation of a cross-section of the lid of FIG. 1, during the manufacturing process.

FIG. 2 shows a cross-section of lid 1 during the molding operation. As shown, spout 3 is not in a fully extended position and is attached to the remainder of lid 1. It is understood that the position of spout 3 with respect to neck 4 may be varied, but it is convenient that spout 3 be centrally located, to reduce the overall dimensions of the mold required.

In FIG. 2, lid 1 is shown as having upper surface 2, spout 3 and neck 4. Neck 4 has thread 10 located thereon, external to spout 3. The upper section of spout 3 has arcuate protrusion 11, which is of the same configuration as arcuate section 12 located on neck 4, such that the surfaces will mate together. Similarly, the lower section of spout 3 has chamfered protrusion 13 which is of the same shape as chamfered section 14 located on neck 4. Arcuate section 12 is located on the upper interior position of neck 4 facing opening 16 in lid 1. Similarly, chamfered section 14 is located on the lower interior section of neck 4, facing opening 16. Neck 4 is connected to spout 3 at spout gate 15. Spout gate 15 is a narrow gate, and normally would be a circumferential gate extending around spout 3, although other configurations may be used provided that acceptable melt flow is achieved during the molding operation.

In operation of the injection molding process, with reference to FIG. 2, molten thermoplastic polymer is injected through a gate into a mold cavity of the shape shown in FIG. 2. Molten polymer travels in the direction indicated by the arrows 17. The part molded in the injection molding operation is as shown in FIG. 2. Techniques for such injection molding will be understood by persons skilled in the art.

Subsequent to the molding operation, after the thermoplastic polymer has been cooled and the part has been removed from the mold, spout 3 is separated from neck 4 by severing or breaking the polymer at gate 15. This permits spout 3 to move vertically within opening 16 of neck 4 from a position in which arcuate protrusion 11 mates with arcuate section 12 to a position where chamfered protrusion 13 mates with chamfered section 14.

Figure 3:
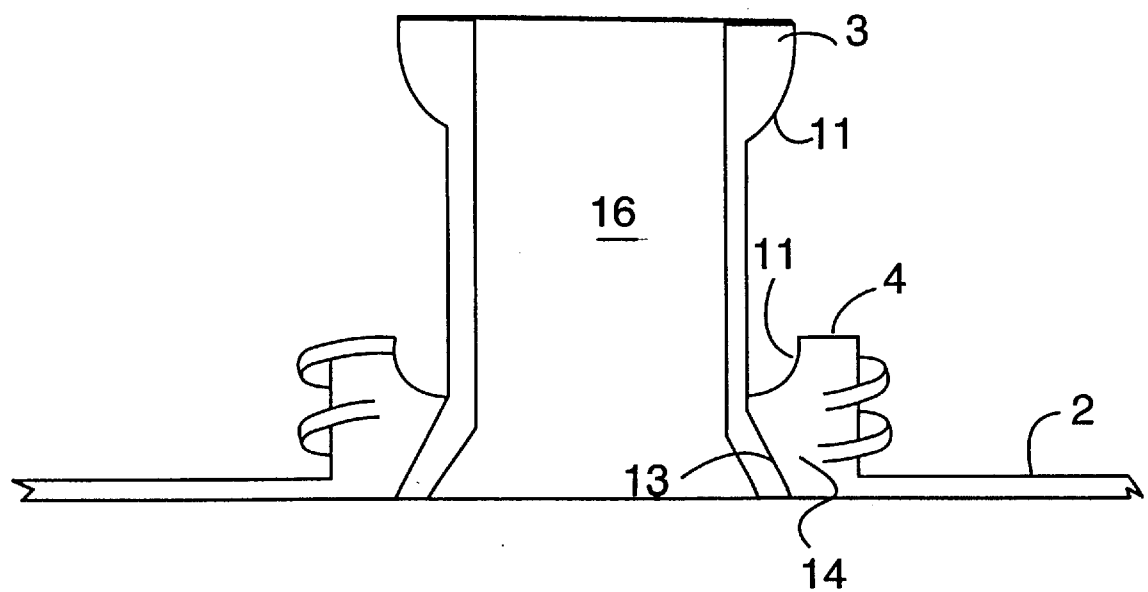
FIG. 3 is a schematic representation of the pouring spout in the pouring position, as seen from A—A of FIG. 1.

FIG. 3 is a cross-section through A—A of FIG. 1. FIG. 3 shows spout 3 in a pouring position, in which chamfered protrusion 13 is mated with chamfered section 14 to provide a seal between spout 3 and neck 4. This seal needs to be effective to the extent that fluid may be poured from the pail.

Figure 4:
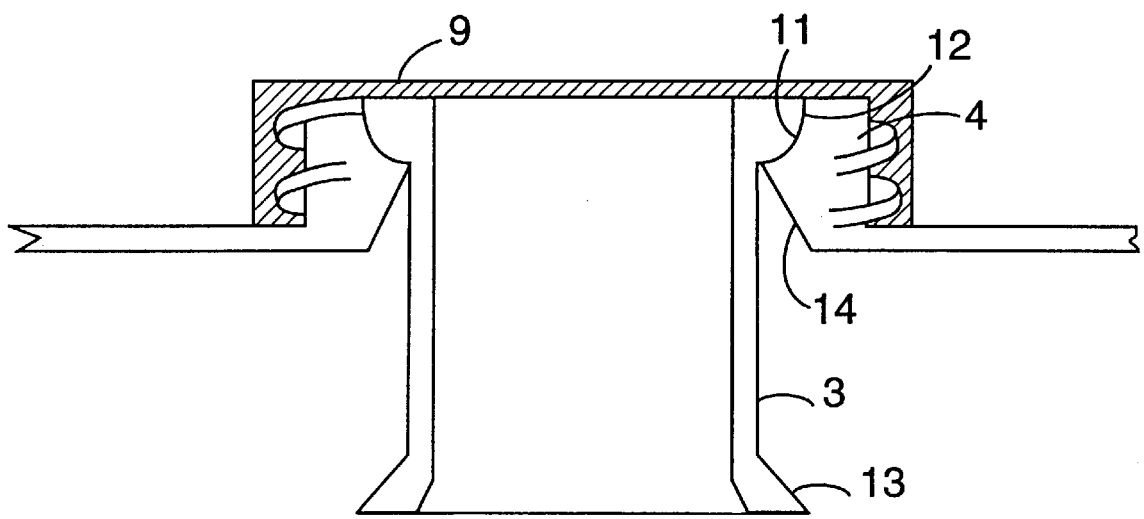
FIG. 4 is a schematic representation of the pouring spout in a retracted position with an end cap, as seen from B—B of FIG. 1A.

FIG. 4 is a cross-section through B—B of FIG. 1A. FIG. 4 shows spout 3 in a retracted position such that arcuate protrusion 11 mates with arcuate section 12. Chamfered protrusion 13 of spout 3 extends downward into the pail. End cap 9 is located on neck 4, having been screwed onto thread 10. End cap 9 provides a seal for the pail, maintaining the contents of the pail within the pail during storage. In the embodiment shown, end cap 9 and the mating of arcuate protrusion 11 with arcuate section 12 provide the seal for the contents of the pail.

Figure 5:
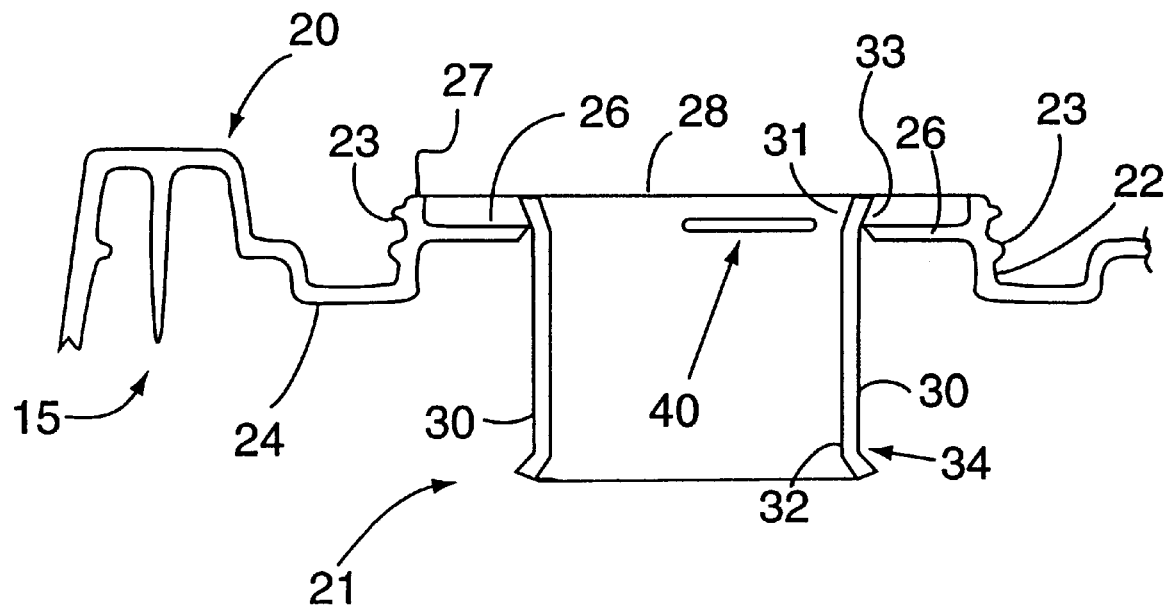
FIG. 5 is a schematic representation of a cross-section of an alternate embodiment of a lid with pouring spout.

An alternate embodiment of a pail lid with a retractable pouring spout is shown in FIG. 5, where the lid and pouring spout are generally indicated by 20 and 21, respectively. Lid 20 has neck 22 with screw thread 23 thereon, for the purpose of attaching a screw cap. Neck 22 is spaced from annular groove 25 by gap 24; it is understood that neck 22 would normally not be centrally located on lid 20 but would be disposed towards the periphery thereof to facilitate removal of the contents of the pail through the spout. Lid 20 has an annular groove, generally indicated by 25, that passes around the circumference of the lid, for the purpose of attaching the lid to the container.

Annular lip 26 is located within neck 22, being spaced downwards from upper edge 27 of neck 22. The periphery of lip 26, which forms the opening within spout 21 for passage of materials therethrough, is undercut (bevelled), as discussed below. A membrane, usually referred to as a tamper-evident liner, 28, is shown as being stretched across upper edge 27 of neck 22, for the dual purpose of sealing the contents in the pail and to provide evidence of any tampering with the contents of the pail. The tamper-evident liner may be formed from a variety of materials, including a foil or a self-adhesive foam material, as will be understood by persons skilled in the art. Alternatively, tamper-evident liner 28 may be part of cap 9 shown in FIG. 1A, especially for installation of liner 28.

Spout 30 is located within neck 22, in an abutting relationship with lip 26, and extends downwardly within neck 22. Pouring spout 30 is cylindrical in shape throughout its length except that it is of slightly increased diameter at both of its ends, 31 and 32. The exterior surface of lower end 32 of pouring spout 30 has circumferential notch 34, for the purpose of locating the bevelled end of lip 26 when pouring spout is in its extended position. Notch 34 is for retention of pouring spout 30 in its extended position, as desired, during normal use of the pail. Pouring spout 30 may be moved from its extended position to its retracted position by pushing the spout downwards with moderate pressure e.g. by forcing with the hand. Spout 30 may also be pulled upwards, but it is more convenient to do so in the manner discussed below.

Figure 6:
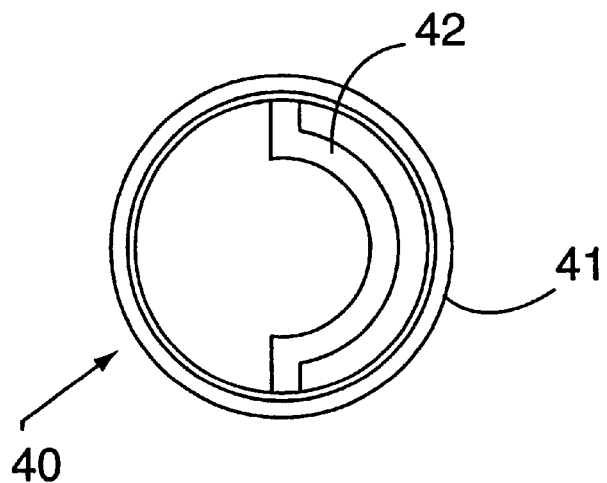
FIG. 6 is a plan view of a pull-tab for the pouring spout.

Pull tab 40, more clearly seen in FIG. 6, is shown as being located within pouring spout 30, approximately at a location opposed to lip 26. Tab 40 is intended to assist in extension of pouring spout 30. While tab 40 could be retained in spout 30 by friction i.e. be force-fit, it is preferred that tab 40 be integrally molded into spout 30. Pull tab 40 is shown in FIG.

6 as having an annular ring 41, which is optional, within pouring spout 30, and an internal tab 42. Tab 42 would normally have some flexibility, and it is intended that a person be able to move spout 30 from its retracted position to its extended position using tab 42 e.g. with a hook or with one of more fingers.

The lid is molding from a thermoplastic polymer using an injection molding process. Thermoplastic polymers suitable for injection molding are known. Such polymers include polyethylene, polypropylene and related polymers. Polyethylene and polypropylene are preferred. However, the lid could be formed from other thermoplastic polymers, including polyamides, polyesters and the like. As will be understood, the particular properties of the thermoplastic polymer used for the manufacture of the lid will be selected so as to provide suitable flow properties in an injection molding process while still retaining adequate properties for the lid while in use.

Procedures for the injection molding of the lid will be understood by persons skilled in the art. In particular, cycle times, pressures and temperatures and other parameters required for suitable molding of the process will be understood. The gate to the cavity of the mold would normally be located at the center of upper surface 2 of lid 1, although it could be located off-center. The narrow gate between spout 3 and neck 4 would normally be a circumferential gate, with the mold having a suitable core located in the position of opening 16. Nonetheless, it is to be understood that gate 15 could be other than a circumferential gate, provided that adequate flow from the neck to the spout was achieved.

The present invention provides a method and a resultant lid, in which the lid is molded in a single molding operation in a single mold cavity, with the spout being separated from the remainder of the lid in a subsequent operation. Such a method offers improved economics in the manufacture of the lid, especially in that only one mold cavity is required and there are no subsequent fabrication steps in the process for the manufacture of the lid, other than severing or breaking of the spout from the neck. Trimming may be required to provide a smooth surface on the exterior surface of spout 3 so that the spout will move easily within the opening 16.

We claim:

1. A pail lid having a retractable pouring spout, said pail lid having opposed faces with an annular groove on one face at the periphery thereof for attachment to a pail, said lid having an opening between said faces juxtaposed to said annular groove with an annular neck surrounding said opening, said neck being integrally formed as part of said lid and extending from the face of the lid opposed to said groove, said neck having external threads thereon adapted to receive a screw cap, a retractable pouring spout located within said opening and retained within said neck by a breakable narrow spout gate that is integrally formed with the retractable pouring spout and the neck, the spout gate being breakable by moving the spout with respect to the lid so as to provide a retractable pouring spout that is movable from a pouring position to a retracted position while being retained within said neck, the spout mating with the neck at each of the pouring position and the retracted position using arcuate or chamfered sections.

2. The paid lid of claim 1 in which the spout has at least one external notch intended to mate with a cooperative surface of a lip within the annular neck to retain the spout in its respective pouring and retracted positions.

3. The pail lid of claim 1 in which a tamper-evident membrane is placed across the upper surface of the neck.

4. The pail lid of claim 1 in which a pull tab is located within the pouring spout.

5. The pail lid of claim 1 in which the lid is formed from a thermoplastic polymer.

6. The pail lid of claim 5 in which the polymer is polyethylene or polypropylene.

\* \* \* \* \*